United States Patent [19]

Yano et al.

[11] Patent Number: 5,125,686
[45] Date of Patent: * Jun. 30, 1992

[54] POSITION ADJUSTING DEVICE FOR A SHOULDER BELT OF A SEAT ASSEMBLY

[75] Inventors: Hideaki Yano; Misao Kamiyama, both of Shiga, Japan

[73] Assignee: Takata Corporation, Tokyo, Japan

[*] Notice: The portion of the term of this patent subsequent to Dec. 17, 2008 has been disclaimed.

[21] Appl. No.: 606,204

[22] Filed: Oct. 31, 1990

[30] Foreign Application Priority Data

Nov. 16, 1989 [JP] Japan .................................. 1-297974

[51] Int. Cl.⁵ .............................................. B60R 22/20
[52] U.S. Cl. ..................................... 280/808; 297/483
[58] Field of Search ............... 280/801, 808; 297/468, 297/483; 411/914, 901, 900

[56] References Cited

U.S. PATENT DOCUMENTS

| | | | |
|---|---|---|---|
| 3,914,178 | 10/1975 | Fineran | 411/914 |
| 3,983,304 | 9/1976 | Sekhon | 411/914 |
| 4,569,558 | 4/1986 | Ramer | 403/122 |

FOREIGN PATENT DOCUMENTS

| | | |
|---|---|---|
| 3744577 | 7/1989 | Fed. Rep. of Germany ...... 280/808 |
| 1169577 | 11/1969 | United Kingdom . |
| 1339775 | 12/1973 | United Kingdom . |
| 1401786 | 7/1975 | United Kingdom . |
| 2104998 | 3/1983 | United Kingdom . |

*Primary Examiner*—Charles A. Marmor
*Assistant Examiner*—Karin Tyson
*Attorney, Agent, or Firm*—Kanesaka and Takeuchi

[57] ABSTRACT

A position adjusting device for a shoulder belt in a seat belt assembly includes a belt anchor into which the shoulder belt is loosely passed, an anchor support block supporting the belt anchor, a guide rail slidably holding the anchor support block, and a straight screw member which is arranged along a longitudinal direction of the guide rail and is screwed into the anchor support member, so that the anchor support block may be moved along the guide rail by the rotation of the screw member. A surface layer of solid lubricant is formed on at least one of thread surfaces of the screw member and the anchor support block.

9 Claims, 7 Drawing Sheets

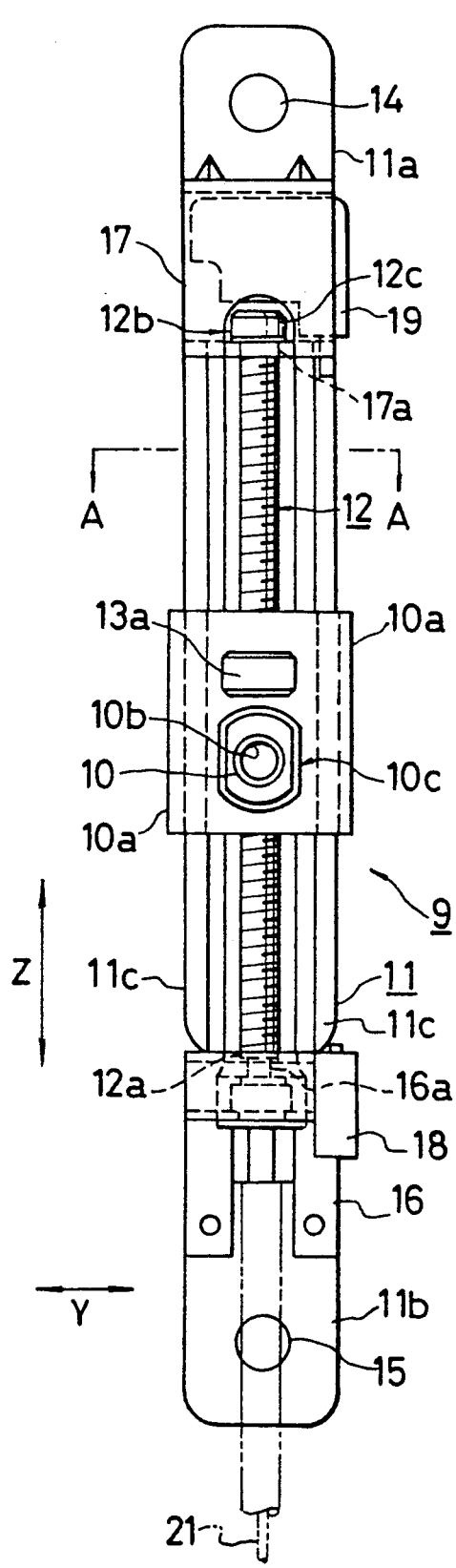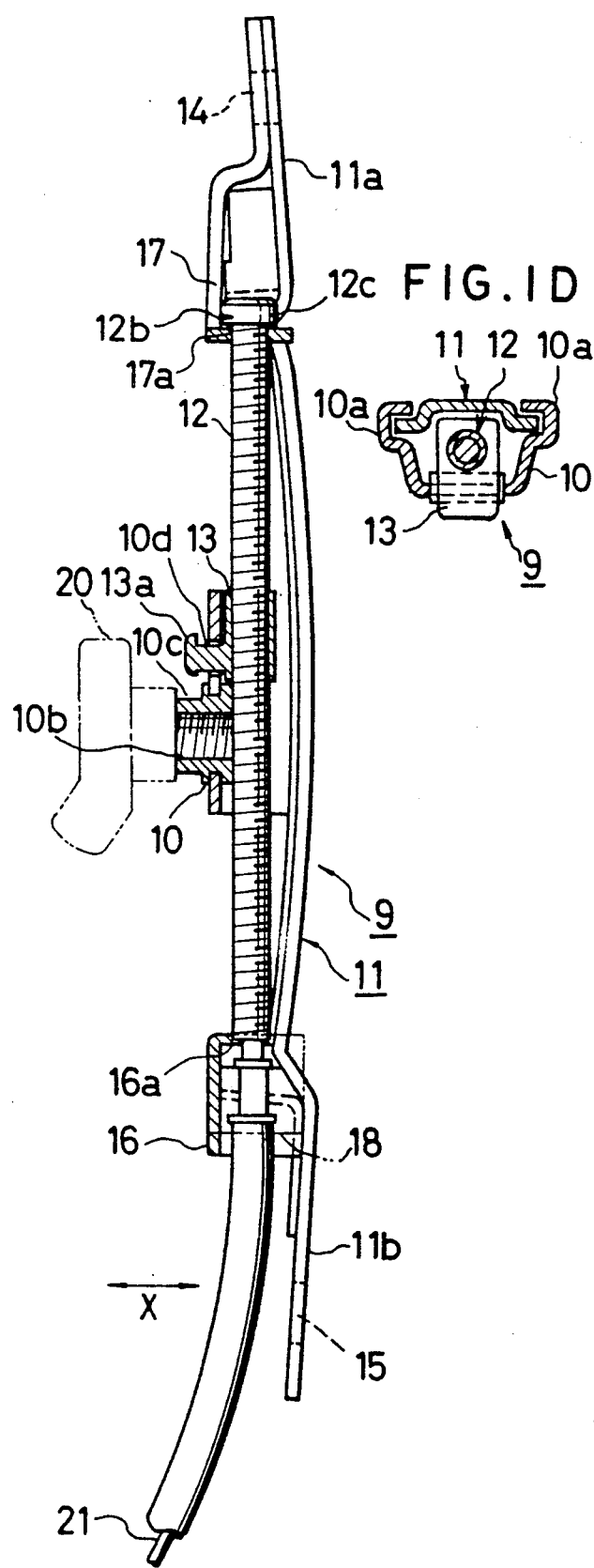

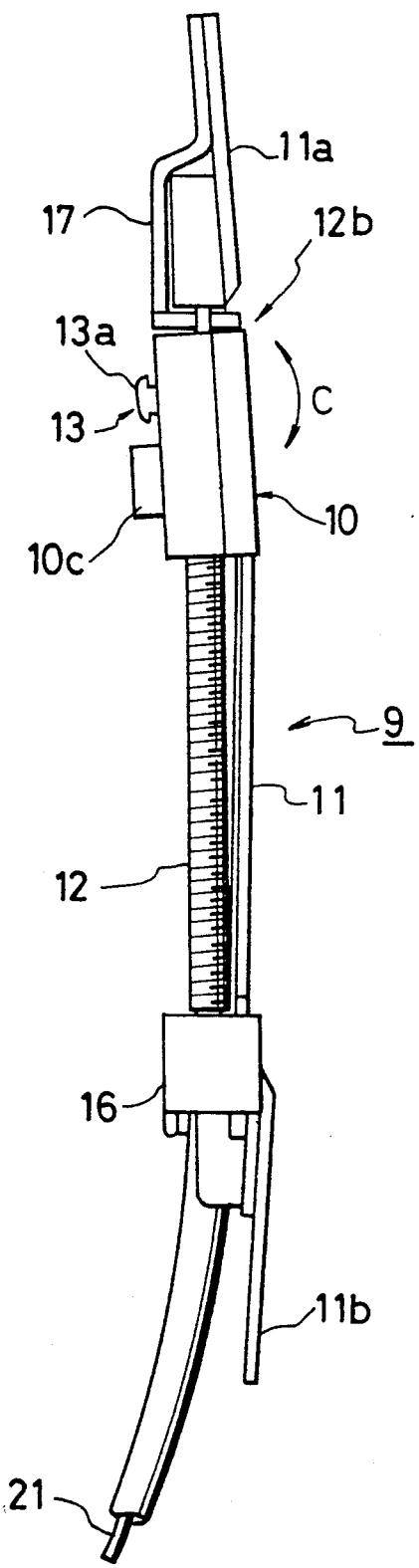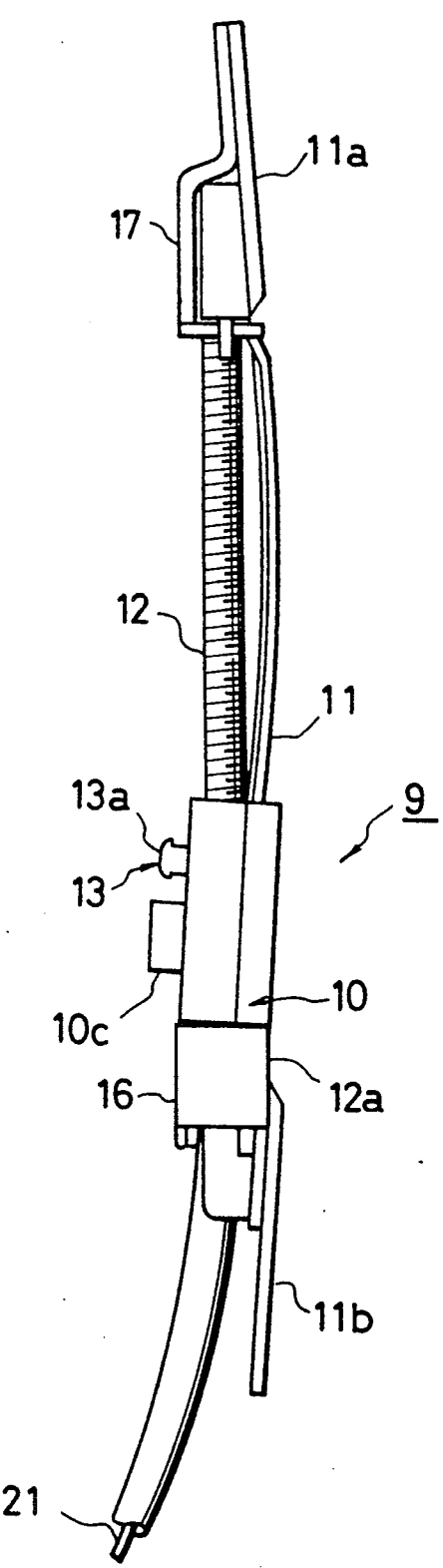

FIG.6A
Prior Art
FIG.6B
Prior Art
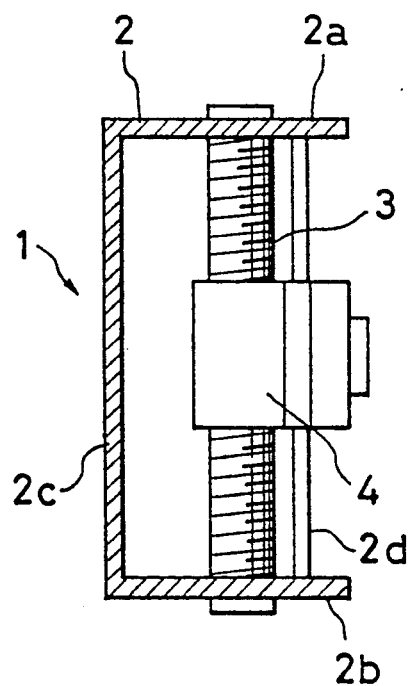
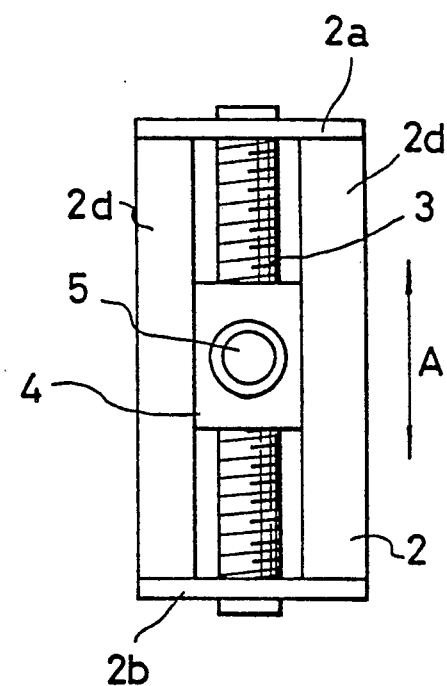

POSITION ADJUSTING DEVICE FOR A SHOULDER BELT OF A SEAT ASSEMBLY

FIELD OF THE INVENTION AND RELATED ART STATEMENT

The present invention relates to a seat belt assembly for protecting and restraining a person on a seat in an automobile or the like, and more particularly to a position adjusting device for a shoulder belt of the seat belt assembly.

Generally, automobiles or the like are provided with seat belts for restraining and protecting persons on the seats in emergency such as collision.

In order to restrain a body of the person by the seat belt, a portion thereof for restraining the body should have a high strength so as to bear an instantaneously generated load corresponding to tens times as large as the weight of the body. Therefore, it is usually preferable to ensure that a lap belt rests on a hipbone and a shoulder belt rests on an intermediate between a shoulder joint and a neck.

However, the seat belt is used to restrain persons of various sizes, i.e., both the children and adults, and further the seat are adjusted to various positions in accordance the respective persons.

In consideration of these problems, a position adjusting device for a shoulder belt of a seat belt assembly has been proposed, in which a position of a belt anchor of the shoulder belt can be adjusted to obtain a restraint condition preferable for each person.

Such conventional position adjusting device for the shoulder belt of the seat belt assembly is illustrated in FIGS. 6A, 6B and 7.

Referring to these figures, in the position adjusting device 1 for the shoulder belt of the seat belt assembly a mounting member 2 of a nearly U-shaped form is mounted on a center pillar 8 in an automobile. The mounting member 2 has opposite bent portions 2a and 2b with a center portion 2c, between which a screw member or shaft 3 is rotatably supported. An anchor support block 4 is so arranged that it may be guided by guide rails 2d and moved in a direction of an arrow A in the figure by the rotation of the screw member 3. In FIG. 6, at 5 is indicated a mounting aperture for mounting a belt anchor 6 which loosely holds a shoulder belt 7 shown in FIG. 7.

In the position adjusting device 1 for the shoulder belt of the seat belt assembly having the structures described above, the anchor support block 4 has an internal thread surface fitted to an external thread surface of the screw member 3 so that the rotation of the screw member 3 may cause the anchor support block 4 to move along the guide rails 2d.

In the above position adjusting device for the shoulder belt, lubricant such as grease may be applied on the thread surfaces of the screw member 3 and the anchor support block 4 so that the anchor support block 4 may be smoothly moved by the rotation of the screw member 3. The lubricant applied to the thread surfaces may however stain the shoulder belt 7 and further clothes of the person in the automobile. Therefore, it is preferable not to use the stainable lubricant such as grease.

In the position adjusting device described above, the screw member 3 mounted to the vehicle body is accommodated in the center pillar 8. Thus, after the position adjusting device for the shoulder belt has been mounted to the vehicle body, the lubricant such as grease can not be applied to the thread surfaces of the screw member 3 and the anchor support block 4. Accordingly, it has been desired to provide a lubricating mechanism which does not require replenishment of the lubricant.

OBJECT AND SUMMARY OF THE INVENTION

An object of the invention is to provide a position adjusting device for a shoulder belt of a seat belt assembly in which an anchor support block can be smoothly moved along a screw shaft so that a position of the shoulder belt can be smoothly adjusted with a significantly reduced noise during this adjusting operation, which improves comfortableness in an vehicle.

According to the invention, the position adjusting device for a shoulder belt of a seat belt assembly, in which a rotation of the screw member moves the anchor support block, comprises a surface layer of solid lubricant formed on at least one of a thread surface of the screw member and a thread surface of the anchor support block.

In the present invention, various kinds of substance such as molybdenum disulfide, fluororesin and graphite may be used as the solid lubricant. It is preferable to form the surface layers of the solid lubricant on the thread surfaces of both the screw member and the anchor support block.

In the position adjusting device for the shoulder belt of the seat belt assembly according to the invention, by virtue of the lubricating effect of the solid lubricant, the anchor support block can be extremely smoothly moved along the screw member.

Contrarily to the lubricant such as grease, the surface layer of the solid lubricant has not stainableness and there is no possibility that it may stain the clothes of the persons. Further, this solid lubricant exhibits the lubricating effect for a long term. Therefore, even after the position adjusting device for the shoulder belt of the seat belt assembly has been mounted inside a center pillar or the like of a vehicle body, the smooth sliding of the anchor support block can be ensured for a long term without a necessity of maintenance.

BRIEF DESCRIPTION OF THE DRAWINGS

FIGS. 1B, 1C and 1D illustrate a position adjusting device for a shoulder belt of a seat belt assembly of an embodiment wherein, FIG. 1B is a plan view, FIG. 1C is a partially cut-away front view and FIG. 1D is a sectional view taken along lines A—A;

FIGS. 4A and 4B are views illustrating an operation of a slider and a movable member;

FIG. 6A is a front view of a conventional position adjusting device for a shoulder belt of a seat belt assembly, and FIG. 6B is a side view thereof.

DESCRIPTION OF THE PREFERRED EMBODIMENTS

Figure 1A:
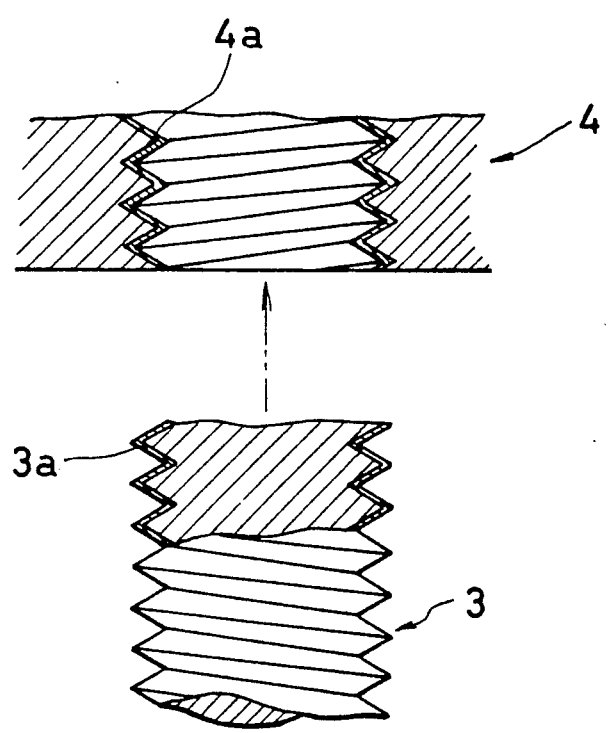
FIG. 1A is a fragmentary sectional view of a screw member and an anchor support member in an embodiment.

FIG. 1A is an enlarged sectional view illustrating an engaged condition of a screw member 3 and an anchor support block 4 in a position adjusting device for a shoulder belt of a seat belt assembly according to an embodiment of the invention. Surface layers 3a and 4a of solid lubricant are formed on both of a thread surface of the screw member 3 and a thread surface of the anchor support block 4. By virtue of lubricating effect of these surface layers 3a and 4a, the anchor support block 4 can extremely smoothly move in accordance with the rotation of the screw member 3.

The surface layers 3a and 4a are preferably paint films formed of paint including solid lubricant. Molybdenum disulfide, fluororesin and graphite may be used as a solid lubricant.

Figure 7:
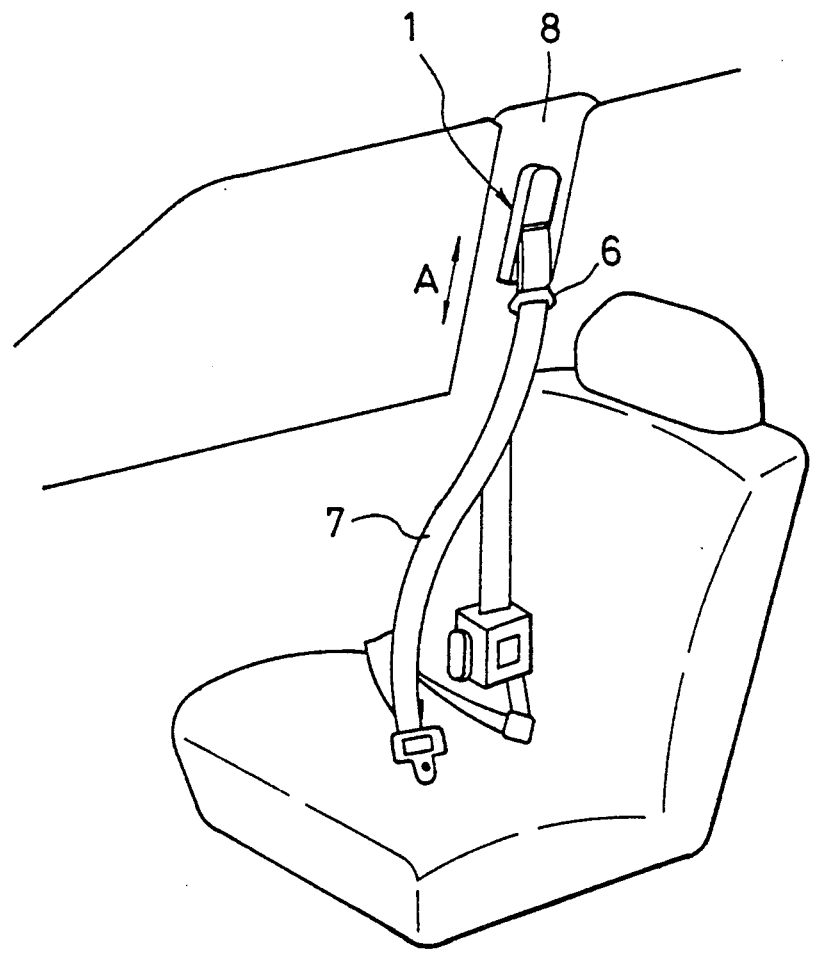
FIG. 7 is a view illustrating a mounting condition of a position adjusting device for a shoulder belt of a seat belt assembly in a vehicle body.

General structures of the position adjusting device for the shoulder belt of the seat belt assembly are same as those shown in FIGS. 6A, 6B and 7, and thus will not be specifically described hereinafter. The present invention may however be applied to various lubricating mechanisms for position adjusting devices for shoulder belts of the seat belt assemblies in addition to the illustrated device.

The invention may suitably applied to such a position adjusting device for a shoulder belt of a seat belt assembly as described hereinafter. This preferable position adjusting device for the shoulder belt in the seat belt assembly comprises a belt anchor into which the shoulder belt is loosely passed, an anchor support block supporting the belt anchor, a guide rail slidably holding the anchor support block, and a straight screw member or shaft which is arranged along a longitudinal direction of this guide rail and screwed into the above anchor support member, so that the anchor support block may be moved along the guide rail by the rotation of the screw member. In this device, an upper end of the screw member is suspended and supported by the guide rail. First, background on which such position adjusting device for the shoulder belt of the seat belt assembly has been developed will be described below.

Generally, a large force is applied to the shoulder belt in emergency such as collision of a vehicle(s). In the conventional device in FIGS. 6 and 7, this force is directly born by the screw member 3 through the anchor 6 and the anchor support block 4.

Therefore, in consideration of such force, the screw member having a large diameter and a high strength for bearing it has conventionally been used, which prevents the compact structure of the position adjusting device.

In the preferable form of the position adjusting device for the shoulder belt in the seat belt assembly, the upper end of the screw member is suspended and supported by the guide rail, so that a horizontal component (in directions X and Y) of the force applied to the belt anchor through the shoulder belt is born by the guide rail as a bending load against the guide rail, and that a vertical component (in the direction Z) thereof is born by the screw member as a tensile load against the screw member. Consequently, a mechanical strength of each member can set low, which allows a compact structure.

Since the bending load is not generally applied to the screw member, it will not be broken, resulting in increase of whole reliability of the device.

The preferable form will be described hereinafter with reference to the drawings.

FIGS. 1B, 1C and 1D are a plan view, a partially cutaway front view and a sectional view taken along lines A—A, respectively, illustrating the position adjusting device for the shoulder belt of the seat belt assembly of the embodiment.

Referring to these figures, the position adjusting device 9 for the shoulder belt of the seat belt assembly comprises an anchor support member 10 (will be called as a "slider" hereinafter) supporting a belt anchor 20, a guide rail 11 slidably holding the slider 10, a screw member 12 which is rotatably attached to opposite ends of the guide rail 11 and is suspended at its upper end (in FIGS. 1B and 1D) by the guide rail 11, and a movable member 13 screwed around the screw member 12 and having a projection 13a loosely fitted into the above slider 10 so as to move together with the slider 10 in accordance with the rotation of the above screw member 12. The movable member 13 and the slider 10 form an anchor support block.

In the above structures, a component in the illustrated directions X and Y (i.e., horizontal component) of the force applied to the belt anchor 20 through the shoulder belt (not shown) is intended to be born by the guide rail 11, and the component in the illustrated direction Z (vertical component) is intended to be born by the screw member 12 through the slider 10. At 19 and 18 are indicated detection switches for detecting upper and lower end positions, respectively.

The guide rail 11 of this embodiment is curvedly formed along a center pillar of an automobile, and has the opposite ends 11a and 11b provided with bolt holes 14 and 15 for mounting it to the center pillar, respectively. Opposite side ends or edges between the opposite ends 11a and 11b form guide pieces 11c for slidably holding and guiding the slider 10. At vicinity of the opposite ends 11a and 11b, mounting members 16 and 17 are arranged for rotatably mounting the opposite ends of the screw member 12.

The above mounting member 16, which is employed to mount and support a lower end 12a of the screw member 12, has a nearly inverted U-shaped form in the front view, of which horizontal upper side is provided with an insert aperture 16a for inserting the lower end 12a of the screw member 12 into it. This mounting member 16 has a fragile structure which will be broken or deformed at a value smaller than the breakage strength of the screw member 12 so that deformation or breakage thereof may release the lower end 12a of the screw member 12.

The mounting member 17, which is employed to mount and support an upper end 12b of the screw member 12, has a strong structure and is provided with an aperture 12a for suspending and supporting the upper end 12b of the screw member. Further, contrary to the mounting member 16, the member 17 bears the component of the force in the illustrated direction Z applied to the screw member 12.

The above screw member 12 is arranged substantially parallel to the guide rail 11 between the mounting members 16 and 17, and is provided at the upper end 12b with a flange 12c to be suspended and supported in the aperture 17a. The lower end 12a is connected to a power transmission wire 21 for transmitting a driving force from a motor (not shown).

Figure 2A:
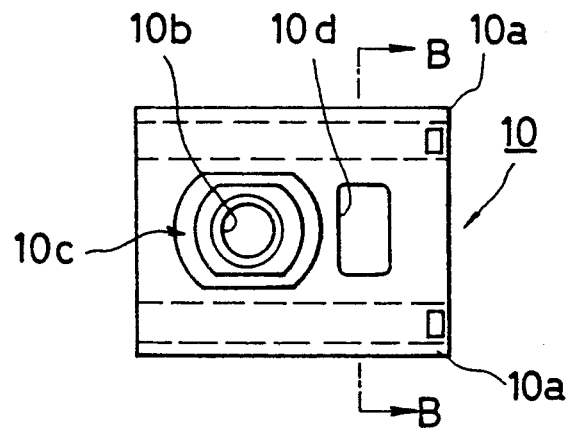
FIG. 2A is a plan view of a slider.
Figure 2B:
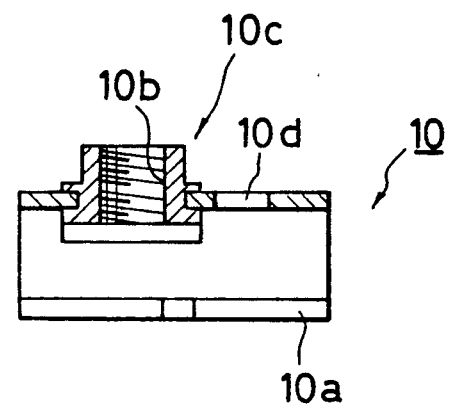
FIG. 2B is a sectional view of the same and FIG. 2C is an end view taken along lines B—B of the same.
Figure 2C:
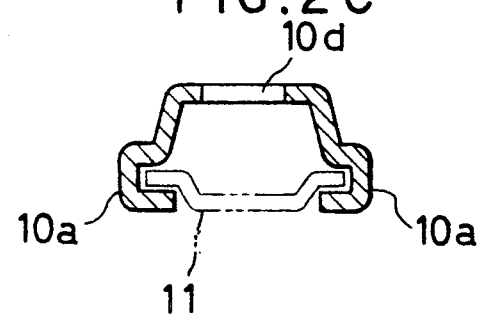

FIGS. 2A, 2B and 2C are a plan view, a sectional view and an end view taken along lines B—B of the slider 10, respectively.

The illustrated slider 10 has a nearly U-shaped section and is provided at opposite sides with engagement portions 10a into which the guide pieces 11c of the guide rail 11 are slidably engaged. The slider 10 is also provided at the illustrated upper surface with an anchor support portion 10c formed of a cylindrical column forming a concentrical internally threaded portion 10b for engaging the belt anchor 20, and a square recess 10d into which the projection 13a of the movable member 13, which will be described later, is loosely fitted.

Figure 3A:
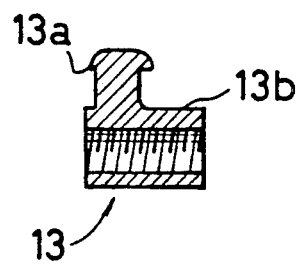
FIG. 3A is a longitudinally sectional view of a movable member.
Figure 3B:
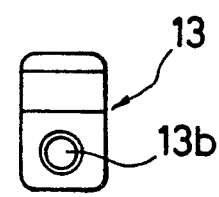
FIG. 3B is a side view thereof.

FIGS. 3A and 3B are a longitudinally sectional view and a side view of the movable member 13.

The illustrated member 13 has the projection 13a similar to a square column, which is loosely fitted in the recess 10d formed in the illustrated upper surface of the slider 10, and an internal threaded portion 13b engaging the above screw member 12. The movable member 13 is prevented from rotation by the projection 13a fitted into the recess 10d, so that it can be moved vertically along the guide rail 11 by the rotation of the screw member 12.

Since the recess 13d and the projection 13a are loosely fitted to each other, when the movable member 13 moves linearly along the screw member 12, the slider 10 can move along the curved guide rail 11.

Then, an operation of the position adjusting device for the shoulder belt of the seat belt assembly having the above structures will be described with reference to FIGS. 4A, 4B, 5B and others.

FIG. 4A illustrates a case in which the movable member 13 and the slider 10 are located at the side of the upper end 12b of the screw member 12. In this condition, when the unillustrated motor 10 drives through the transmission wire 21 causing the screw member 12 to rotate in a positive direction, the movable member 13 is moved linearly along the screw member 12. At the same time, the slider 10 is moved together with the movable member 13 along the curved guide rail 11. When the screw member 12 is rotated reversely, the movable member 13 and the slider 10 move toward the upper end 12b in a similar manner. In this movement, since the projection 13a is loosely fitted into the recess 10d, the slider 10 can freely move in the horizontal direction toward and away from the moving member 13, and can incline as indicated by an arrow C.

Figure 5:
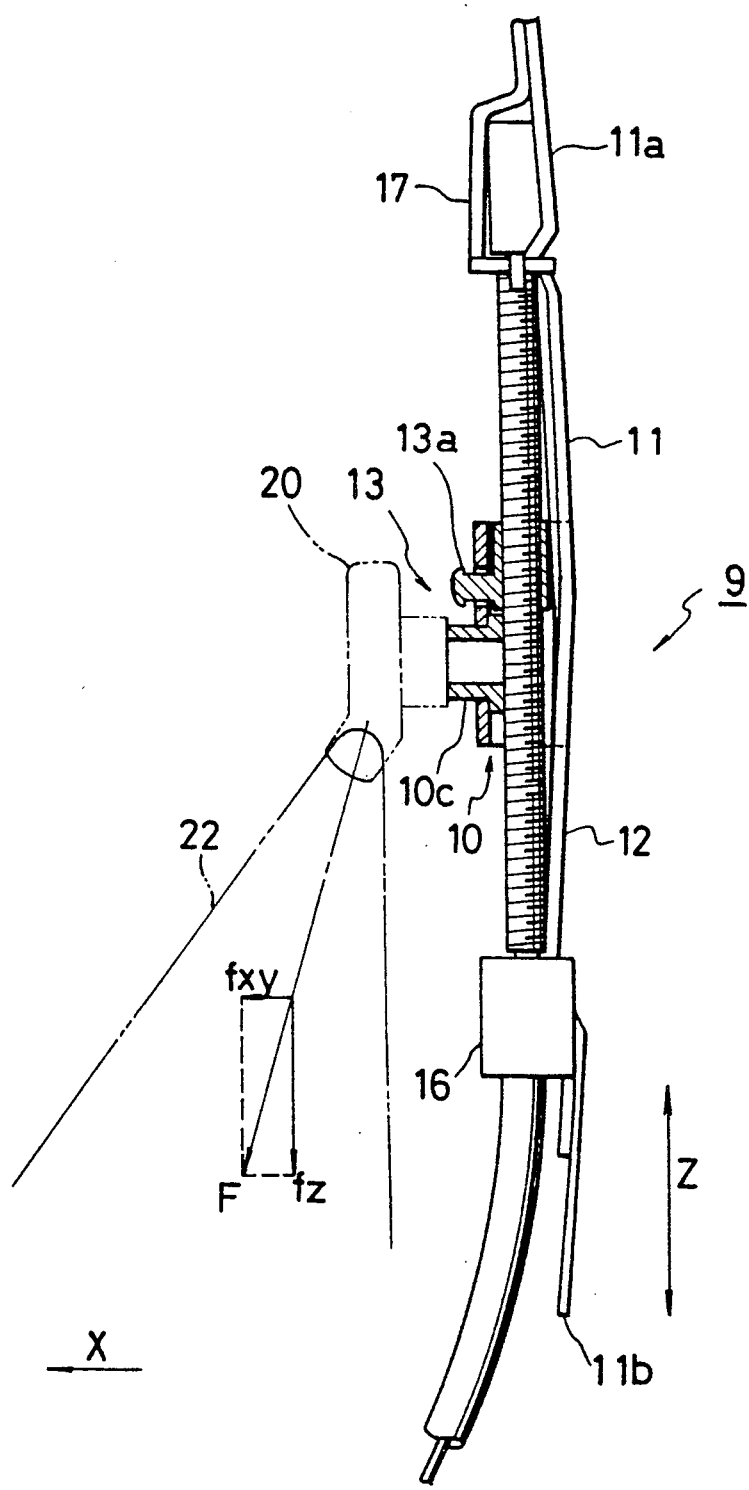
FIG. 5 is a view illustrating an action of a force applied by a shoulder belt.

An operation, in which the belt anchor 20 receives the force F through the shoulder belt 22 loosely connected to the belt anchor 20, will be described with reference to FIG. 5.

The force F is composed of a component $f_z$ in the direction Z (vertical direction) parallel to the screw member 12 and a component $f_{xy}$ in the directions X and Y (horizontal direction) perpendicular thereto.

The component $f_{xy}$ in the directions X and Y of the force applied to the shoulder belt 22 is born by the slider 10 and the guide rail 11. However, since the slider 10 is in loose engagement with the movable member 13, the component $f_{xy}$ in the directions X and Y is not applied to the movable member 13 and the screw member 12.

In the direction Z, since the slider 10 is merely engaged with the movable member 13, the component $f_z$ in the direction Z is not born by the slider 10 and the guide rail 11, and thus is born by the movable member 13 and the screw member 12 supported at the upper end 12b. Therefore, only a tensile stress is applied to the screw member 12 and a bending stress is not applied thereto. Consequently, the screw member 12 can have a diameter smaller than that of the conventional member without a possibility of breakage. Therefore, the whole device can be compact.

When the component $f_{xy}$ in the directions X and Y increases to a value larger than a maximum allowable strength (plastic deformation strength) of the guide rail 11, the guide rail 11 curvedly deforms to a degree corresponding to the component $f_{xy}$ in the directions X and Y, and a bending force is applied to the screw member 12. In consideration of this, the mounting member 16 in the illustrated embodiment has so fragile structure that it may deform or break at a value smaller than the breakage strength of the screw member 12, and is constructed to release the lower end 12a of the screw member 12 when deformed or broken, so that the screw member 12 will not receive a bending force larger than the releasing force.

Further, in the embodiment, the guide rail 11 may be curvedly formed to extend closely along the center pillar, which also contributes to the compact structure.

Even in the position adjusting device constructed as above, by virtue of the surface layers of the solid lubricant formed on the internal thread surface of the movable member 13 and the external thread surface of the screw member 12, the slider 10 can be smoothly moved along the guide rail 11.

What is claimed is:

1. A position adjusting device for a shoulder belt in a seat belt assembly, comprising:

a guide rail adapted to be attached to a vehicle and having upper and lower portions;

an anchor support member having a surface portion slidably attached to and engaged with the guide rail adapted to support a belt anchor;

a screw shaft disposed parallel to the guide rail and having a thread surface and upper and lower ends rotatably attached to the upper and lower portions of the guide rail, said upper end of the screw shaft being supported by and suspended from the upper portion of the guide rail;

a movable member screwed to the screw shaft, said movable member being moved along the guide rail when the screw shaft is rotated, said movable member having a thread surface and means for loosely supporting the anchor support member in a lateral direction perpendicular to the guide rail so that lateral force applied to the anchor support member perpendicular to the guide rail is substantially directly supported by the guide rail without affecting to the screw shaft; and a surface layer formed of solid lubricant, said surface layer being formed on at least one of the thread surfaces of the screw shaft and the movable member.

2. A device according to claim 1, wherein said solid lubricant is disposed on both the thread surfaces of said screw shaft and the movable member.

3. A device according to claim 1, wherein said solid lubricant is molybdenum disulfide, fluororesin or graphite.

4. A position adjusting device according to claim 1, wherein said lower end of the screw shaft is attached to the lower portion of the guide rail so that when lateral force which is greater than a predetermined force and weaker than breaking force of the screw shaft is applied to the screw shaft through the anchor support member and the movable member, the lower end of the screw shaft is detached from the lower portion of the guide rail to prevent breakage of the screw shaft.

5. A position adjusting device according to claim 1, wherein said guide rail is formed to be curved along a center pillar of an automobile.

6. A position adjusting device according to claim 1, wherein said upper portion of the guide rail has a hole, said screw shaft having a flange greater than the hole, said screw shaft being located in the hole of the guide rail so that the flange of the screw shaft rotatably supports the screw shaft.

7. A position adjusting device according to claim 1, further comprising a transmission wire connected to the screw shaft for rotating the screw shaft.

8. A position adjusting device according to claim 1, wherein said guide rail includes a mounting member fixed to the lower portion of the guide rail, said lower end of the screw shaft being retained by the mounting member, said mounting member, when lateral force which is greater than a predetermined force and weaker than breaking force of the screw shaft is applied to the screw shaft through the anchor support member and the movable member, being detached from the guide rail to allow the lower end of the screw shaft to move away therefrom to prevent breakage of the screw shaft.

9. A position adjusting device according to claim 1, wherein said anchor support member includes a hole, and said means for loosely supporting the anchor support member is a projection loosely situated in the hole so that when the screw shaft is rotated, the anchor support member is moved along the screw shaft together with the movable member.

* * * * *